United States Patent
Ketterer et al.

(10) Patent No.: US 6,314,723 B1
(45) Date of Patent: Nov. 13, 2001

(54) METHOD OF CHECKING THE FUNCTIONAL CAPABILITY OF A CATALYTIC CONVERTER

(75) Inventors: Alexander Ketterer, Regensburg; Hartmut Pfleger, Donaustauf, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/536,175

(22) Filed: Mar. 27, 2000

(30) Foreign Application Priority Data

Mar. 26, 1999 (DE) .............................. 199 13 901

(51) Int. Cl.$^7$ ...................................... F01N 3/00
(52) U.S. Cl. ................. 60/277; 60/274; 60/276; 123/109
(58) Field of Search .............. 60/274, 276, 277, 60/285; 701/109, 103

(56) References Cited

U.S. PATENT DOCUMENTS

| | | | |
|---|---|---|---|
| 5,077,970 | * | 1/1992 | Hamburg ............................... 60/274 |
| 5,609,023 | * | 3/1997 | Katoh et al. ........................... 60/276 |
| 5,678,402 | * | 10/1997 | Kitagawa et al. ..................... 60/276 |
| 5,848,528 | * | 12/1998 | Liu ......................................... 60/274 |
| 5,956,941 | * | 9/1999 | Cullen et al. .......................... 60/274 |
| 6,003,307 | * | 12/1999 | Naber et al. ........................... 60/274 |
| 6,006,153 | * | 12/1999 | Stander et al. ........................ 701/109 |

FOREIGN PATENT DOCUMENTS

| | | |
|---|---|---|
| 19630940A1 | 2/1998 | (DE) . |
| 0444783A1 | 9/1991 | (EP) . |

\* cited by examiner

*Primary Examiner*—Thomas Denion
*Assistant Examiner*—Binh Tran
(74) *Attorney, Agent, or Firm*—Herbert L. Lerner; Laurence A. Greenberg; Werner H. Stemer

(57) ABSTRACT

In order to check the functional capability of a three-way catalytic converter of a lambda-controlled internal-combustion engine, the efficiency of the catalytic converter is determined in a conventional way by determining the oxygen storage capability of the catalytic converter. In order to be able to adjust the efficiency with regard to temperature changes, a substitute value for the temperature in the catalytic converter is calculated. Using this substitute value, the efficiency, which has been determined for the catalytic converter, is adjusted for temperature influences. The measure of the functional capability of the catalytic converter thus obtained is accurate even after non-steady-state operating phases of the internal-combustion engine when the catalytic converter is not yet isothermal.

5 Claims, 2 Drawing Sheets

METHOD OF CHECKING THE FUNCTIONAL CAPABILITY OF A CATALYTIC CONVERTER

BACKGROUND OF THE INVENTION

Field of the Invention

The present invention concerns a method of checking the functional capability of a catalytic converter.

In lambda-controlled internal-combustion engines, a catalytic converter, usually a three-way catalytic converter, is used in the exhaust system for emission control, wherein the efficiency of the catalytic converter is essential for the quality of the emission control. However, aging and contamination reduce the converting capability of the catalytic converter and consequently its efficiency. It is known that the oxygen storage capability of a catalytic converter decreases with its efficiency. The oxygen storage capability of a three-way catalytic converter is, however, strongly temperature-dependent.

To ensure that given limit values are met during the operation of the internal-combustion engine, the efficiency of the catalytic converter is checked on the basis of the oxygen storage capability. If the efficiency of the catalytic converter falls below a predetermined threshold, which may for example have the consequence that the exhaust gas emitted does not meet legal regulations, a signal indicating a defective catalytic converter is generated.

Published Non-Prosecuted European Patent Application EP 0 444 783 A1 discloses a method of monitoring the efficiency of a catalytic converter in which an oxygen sensor which measures the oxygen concentration in the exhaust gas is provided at the outlet of the catalytic converter. Since in conventional lambda control the air/fuel ratio fed to the internal-combustion engine is set such that it oscillates about the lambda value one, the oxygen sensor downstream of the catalytic converter measures an oscillating oxygen concentration. According to Published Non-Prosecuted European Patent Application EP 0 444 783 A1, the difference between the maximum value and the minimum value of this oscillating oxygen concentration is used as a measure of the oxygen storage capability and consequently of the efficiency and converting capability of the catalytic converter, in particular, the smaller the difference between the maximum value and the minimum value, the higher the efficiency of the catalytic converter.

Published Non-Prosecuted German Patent Application DE 196 30 940 A1 and the corresponding U.S. Pat. No. 5,862,661 disclose a further method of monitoring the functional capability of a catalytic converter, in which the mean value of the oxygen concentration downstream of the catalytic converter is determined from the signal of an oxygen sensor. The area bounded by the oscillation of the oxygen sensor signal about this mean value is used as a measure of the oxygen storage capability of the catalytic converter.

Both methods work in a continuous manner in a certain time pattern and consequently utilize the fact that the signal of the oxygen sensor downstream of the catalytic converter allows to ascertain the oxygen storage capability of the catalytic converter.

Both methods, in particular the method according to DE 196 30 940 A1, allow a relatively accurate ascertainment of the efficiency of the catalytic converter, but require essentially steady-state operating conditions of the internal-combustion engine, since the temperature of the exhaust gas of a lambda-controlled internal-combustion engine, and consequently the temperature of the catalytic converter, depends strongly on the operating condition of the internal-combustion engine. The non-isothermal behavior of the catalytic converter after non-steady-state operating conditions is particularly pronounced if the catalytic converter exhibits strong temperature fluctuations on account of the installation conditions. This is the case, for example, with a metal catalytic converter, which has a high thermal conductivity due to its physical properties. Catalytic converters which are provided close to the exhaust manifold and have a small volume are also subjected to strong temperature fluctuations. Such catalytic converters are increasingly used in internal-combustion engines, since they can be installed advantageously on account of the close proximity to the internal-combustion engine and, what is more, respond rapidly when the internal-combustion engine is started.

With the requirement for steady-state operating conditions, it is attempted to ensure that the catalytic converter is isothermally at the temperature of the exhaust gas. Then the temperature of the exhaust gas is taken into account when determining the efficiency of the catalytic converter.

SUMMARY OF THE INVENTION

It is accordingly an object of the invention to provide a method of checking the functional capability of a catalytic converter, in particular a three-way catalytic converter, which overcomes the above-mentioned disadvantages of the heretofore-known methods of this general type and which does not require to impose such strict requirements with regard to steady-state operating conditions.

With the foregoing and other objects in view there is provided, in accordance with the invention, a method of checking a functional capability of a catalytic converter in an exhaust system of a lambda-controlled internal-combustion engine. The method includes the steps of:

determining an efficiency value of an efficiency of the catalytic converter by determining an oxygen storage capability of the catalytic converter;

calculating a substitute value for a temperature in the catalytic converter;

adjusting the efficiency value for temperature influences with the substitute value for providing an adjusted efficiency value; and subsequently obtaining a measure of a functional capability of the catalytic converter from the adjusted efficiency value.

In other words, according to the invention, a substitute value for the temperature in the catalytic converter is calculated and the value for the efficiency of the catalytic converter, which is determined in a conventional manner, is adjusted for temperature changes. In this way, the requirements for the steady state of the operating conditions can be relaxed.

A measure of the functional capability is then obtained from the efficiency of the catalytic converter, for example by calculating a normalized value averaged over various test cycles. If a threshold value is exceeded, the catalytic converter is identified as defective, which is displayed in a suitable manner.

The invention is based on the realization that, even after non-steady-state operating conditions, i.e. when the internal-combustion engine is again running in a largely steady-state operating phase, the temperature changes in the catalytic converter have not yet been completed. The value for the efficiency of the catalytic converter, which has been determined by conventional methods, is therefore corrected through the use of the substitute value, which takes into account these temperature influences in the not yet isothermal catalytic converter after non-steady-state operating conditions.

For this purpose, this substitute value is calculated in the same time frame or time pattern as the efficiency of the catalytic converter.

For calculating the substitute value, preferably the heat supplied by the exhaust gas is added up. This addition of heat can be gathered from a characteristic map, dependent on the speed and load of the internal-combustion engine. In order in this case to take into account only short-term temperature changes and not to allow the substitute value to be falsified by long-term, almost isothermal trends, which after all are already included in the determination of the efficiency of the catalytic converter according to one of the known methods by taking the temperature of the exhaust gas into account, the substitute value can be subjected to low-pass filtering, and this low-pass-filtered value can be deducted from the substitute value, so that only short-term temperature changes are reflected in the substitute value.

In accordance with another mode of the invention, the substitute value is subjected to a smoothing function, which may for example cause a PT1 smoothing.

In accordance with a further mode of the invention, a correction factor is calculated from the substitute value. The efficiency value is multiplied by the correction factor for providing the adjusted efficiency value.

In accordance with yet a further mode of the invention, a non-steady-state operating condition of an internal-combustion engine is determined when a change of a speed and/or a load of the internal-combustion engine exceeds a respective given limit. The method of checking the functional capability of the catalytic converter or at least the step of obtaining the measure of the functional capability of the catalytic converter is suspended during the non-steady-state operating condition.

In accordance with a further mode of the invention, a plurality of averaging steps are performed for continuously averaging the measure of the functional capability of the catalytic converter. After a sufficient number of averaging steps, a decision is made that the catalytic converter is functioning, if the last averaging step results in an averaged value below a threshold value.

Other features which are considered as characteristic for the invention are set forth in the appended claims.

Although the invention is illustrated and described herein as embodied in a method of checking the functional capability of a catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
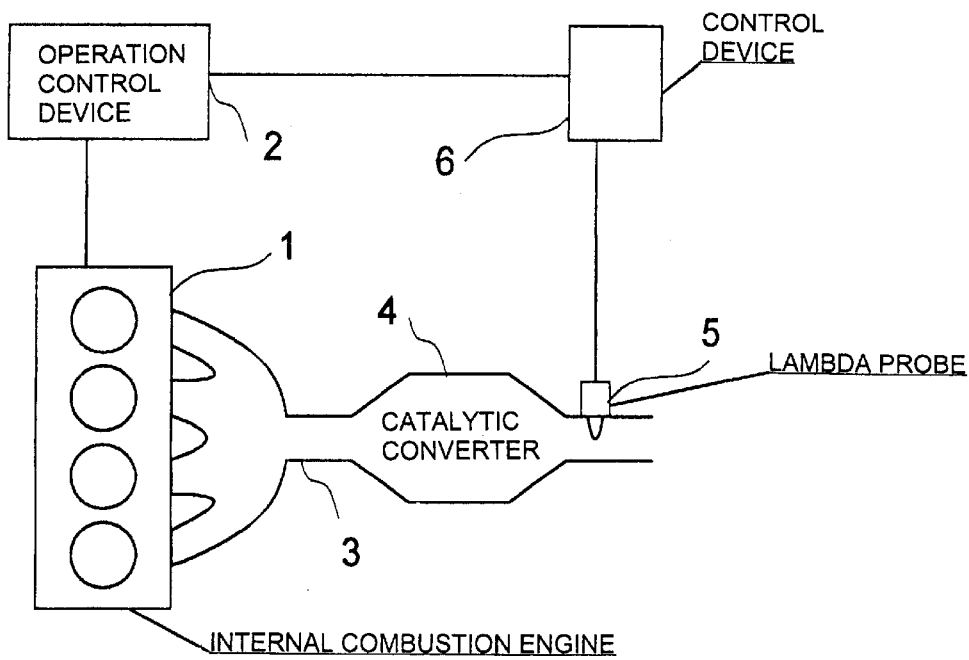
FIG. 1 is a schematic view of an internal-combustion engine in which the method of checking the functional capability of the catalytic converter is used.

Referring now to the figures of the drawings in detail and first, particularly, to FIG. 1 thereof, there is schematically shown an internal-combustion engine for which the method of checking the functional capability of the catalytic converter is to be used. Only the elements which are essential for an understanding of the invention are schematically shown.

The internal-combustion engine 1 has an exhaust system 3, in which there is provided a three-way catalytic converter 4, downstream of which there is a lambda probe 5. This lambda probe 5 is connected to a control device 6, which controls the lambda probe 5 and in which the method of checking the functional capability of the three-way catalytic converter proceeds. For this purpose, the control device 6 is connected to an operation control device 2 of the internal-combustion engine 1, which controls and regulates the operation of the internal-combustion engine.

During operation, the operation control device 2 measures the air mass or air flow taken in by the internal-combustion engine 1 and determines on the basis of the air mass, which has been measured, a corresponding amount of fuel. The amount of fuel is adjusted in an injection system of the internal-combustion engine 1 such that during a combustion an essentially stoichiometric ratio of air and fuel is achieved, wherein the stoichiometric ratio corresponds to a lambda value of one.

The lambda probe 5 detects the oxygen concentration in the exhaust gas downstream of the catalytic converter 4. On the basis of the known closed-loop lambda control of the internal-combustion engine 1, the output signal of the lambda probe 5 exhibits an oscillation about a mean value. The measured values for the oxygen concentration in the exhaust gas which are supplied by the lambda probe 5 are in this case reported to the operation control device 2 by the control device 6.

By oxidizing pollutants, the exhaust gas in the exhaust system 3 is cleaned of carbon monoxide and hydrocarbons in the catalytic converter 4. One measure of the oxidation capability, and consequently the efficiency of the catalytic converter 4, is the oxygen storage capability. A catalytic converter 4 with good efficiency therefore evens out the fluctuations of the oxygen behavior in the exhaust gas, so that the lambda probe 5 detects only a slight oscillation of the oxygen concentration. Therefore, according to the prior art, the measuring signal of the lambda probe 5 is used by the control device 6 for assessing the efficiency of the catalytic converter 4.

If a poor efficiency is ascertained, this is then stored for example in a defect memory in the control device 6 or in the operation control device 2, or a corresponding warning signal is displayed.

To establish this poor converting capability, according to EP 0 444 783 A1 or DE 196 30 940 A1 the signal of the lambda probe 5 is assessed in order to ascertain the magnitude of the oscillation of the oxygen concentration downstream of the catalytic converter 4. In this case, the temperature of the exhaust gas determined by the operation control device 2, for example on a model basis, is taken into account. Regarding the details of such a determination of the temperature, reference is made to these two publications.

Figure 2:
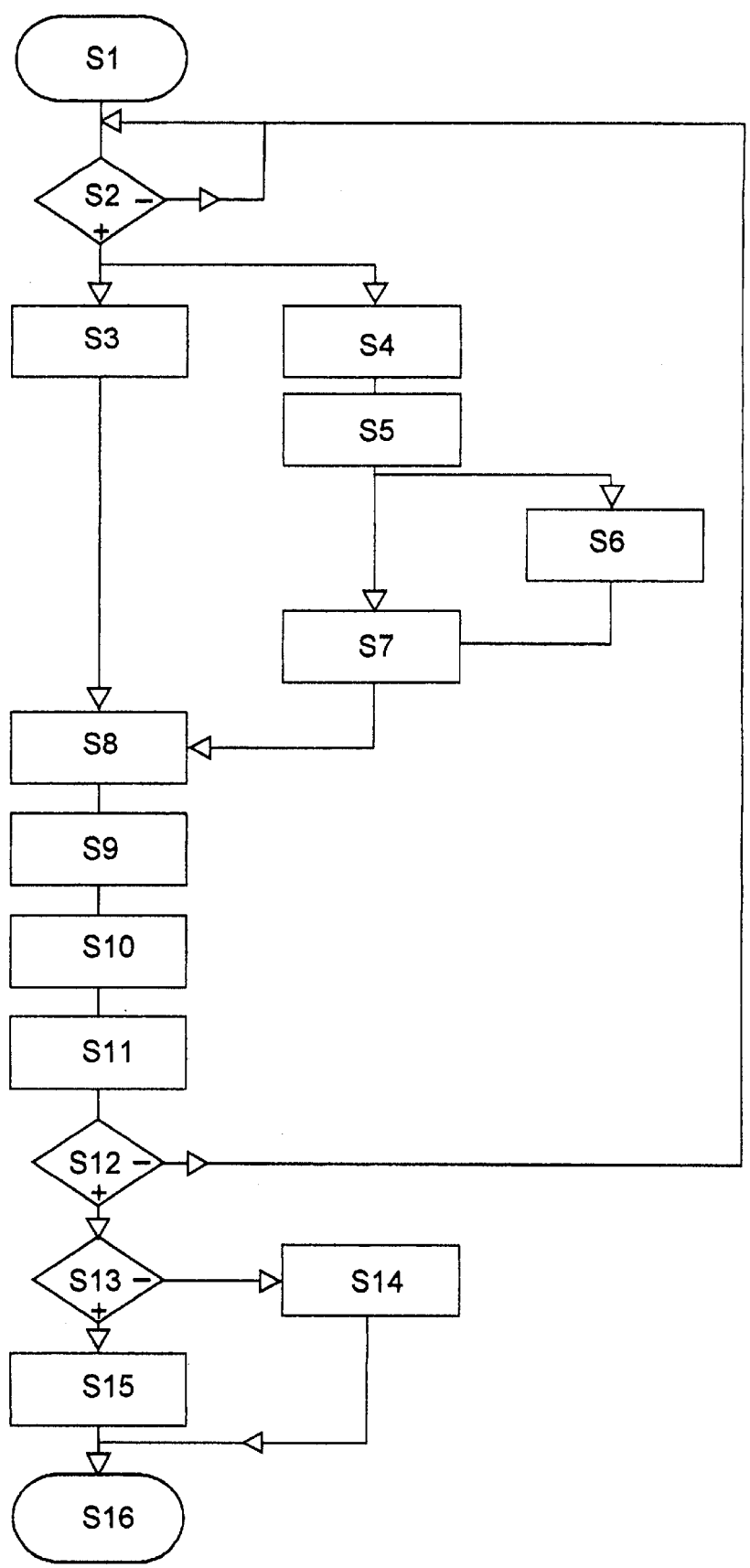
FIG. 2 is a flow diagram of the method according to the invention.

For an understanding of this invention, the only essential aspect is that a value which reflects the efficiency of the catalytic converter is obtained in an iterative and continuous manner from the oxygen storage capability of the catalytic converter 4. It is also important that this value, obtained in a known way, is meaningful only in steady-state operating conditions or almost steady-state load and speed ranges, since only then is it correct to assume that the temperature of the catalytic converter corresponds to the temperature of the exhaust gas. This value is usually normalized such that it lies between 0 and 1. This value for the efficiency of the catalytic converter is then adjusted such that the requirements regarding steady-state conditions are less stringent. FIG. 2 shows a flow diagram in this respect in which the numbers following the letter S designate the respective step numbers.

S1: Start of the method

S2: It is checked whether certain boundary conditions necessary for being able to carry out the method are satisfied. For instance, there must not be an error message for any of the components concerned, the operating temperature of the internal-combustion engine must lie in a predetermined range, and similarly the temperature of the exhaust gas must lie in a certain window or temperature range. Furthermore, the dynamics of the internal-combustion engine must not exceed an upper limit. If one of these conditions is not satisfied, the system jumps back to the branch identified by "−" and the inquiry is checked again. If the conditions are satisfied, the system proceeds with the branch identified by "+".

S3: This step is executed in parallel with S4. The value eta_kat is determined in a known way for the efficiency of the catalytic converter. S4: In this step, the substitute value is calculated from the heat input into the catalytic converter by the exhaust gas. For this purpose, the heat transferred from the exhaust gas to the catalytic converter is determined with a characteristic map which may for example include the heat transfer as a function of the speed and load of the internal-combustion engine. The characteristic map has been determined using a suitable test-bed engine.

S5: The substitute value determined in S4 is summed. In this case, the current substitute value is added in every iteration step of this iteratively performed method. The sum thus obtained is on the one hand further processed in step S6 and on the other hand supplied directly to step S7.

S6: In this step, the sum is subjected to a low-pass filtering and the result is supplied to step S7.

S7: In step S7, the result of the low-pass filtering from step S6 is subtracted from the sum supplied by step S5, so that the result obtained in step S7 reflects only the short-term changes of the substitute value on the basis of the heat input. This result, achieved by steps S6 and S7, can be realized, for example, by decrementing the sum of the substitute values supplied by S5 by a predetermined value in the given time frame. The value thus obtained, reflecting only short-term temperature changes, represents a correction factor, which is supplied to step S8.

S8: In step S8, the efficiency of the catalytic converter from step S3 is multiplied by the correction factor from step S7. The correction factor is in this case dimensioned such that it assumes the value 1 if no correction is to be carried out, i.e. if the catalytic converter is isothermal.

S9: In each iteration run, a counter is incremented.

S10: The corrected efficiency of the catalytic converter is summed, in that in each iteration run the current efficiency of the catalytic converter is added to the sum obtained up to that point.

S11: A mean value is formed from the counter value from S9 and the sum value of the efficiencies of the catalytic converter.

S12: If the counter from S9 has reached a minimum number of iterations, i.e. checking cycles, the system proceeds with S13, otherwise it jumps back to the beginning of the method, for a further iteration ("−" branch).

S13: If the mean value determined in S11 is below a predetermined threshold value, the system continues with S15 ("+" branch), otherwise it jumps back to S14 ("−" branch).

S14: Since the mean value does not keep below the predetermined threshold value, the catalytic converter is defective and corresponding measures, such as a defect indication, a storing of information in the defect memory etc., are initiated.

S15: Since the mean value has remained below the predetermined threshold value, the catalytic converter is functioning properly. The method has been successfully completed for this operating run of the internal-combustion engine. If appropriate, corresponding information can be stored.

S16: End of the method.

In FIG. 3 it is shown how the efficiency eta_kat, which reproduces the efficiency of the catalytic converter, may behave when there is a change between two steady-state operating conditions, and how the correction factor behaves at the same time.

Figure 3A:
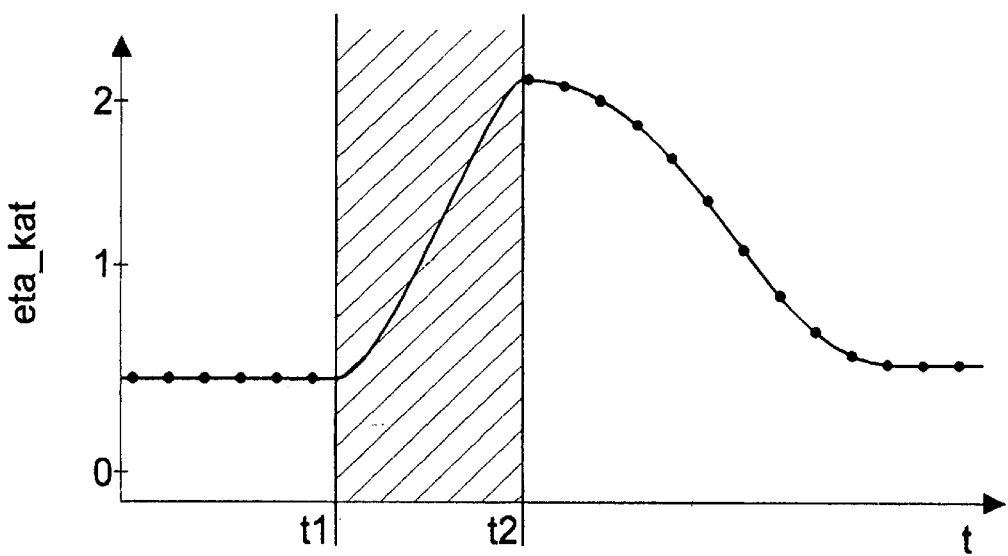
FIGS. 3a and 3b are graphs of time series of the efficiency of the catalytic converter and of a correction factor, respectively.

FIG. 3a illustrates the time series of the efficiency eta_kat of the catalytic converter. Up until the point in time t1, the internal-combustion engine is operated almost in a steady state, i.e. load and speed only undergo changes within a predetermined window. Each point on the curve of FIG. 3a indicates an iteration run through the method of the flow diagram of FIG. 2. As can be seen, each of the iteration runs up to the point in time t1 supplies essentially the same value. Between points in time t1 and t2, the operation of the internal-combustion engine is in a non-steady state or non-stationary state, for example the engine speed increases considerably. By the point in time t2, this non-steady-state transition has ended and the operating parameters of the internal-combustion engine revert to the almost steady-state window, as required by the determination of the efficiency of the catalytic converter. Nevertheless, the efficiency of the catalytic converter eta_kat, originally normalized to 1, exhibits values around 2. This is due to the fact that, although the internal-combustion engine has reached a steady-state operating phase again, the catalytic converter 4 is not isothermal. The temperature of the exhaust gas, which before the point in time t1 may have been 550° C., for example, has indeed increased to 700° C. in the operating phase after t2, but the entire catalytic converter is not yet isothermal. The fact that an efficiency of the catalytic converter eta_kat of over 1 is obtained in this case is due to the fact that the method for determining the efficiency of the catalytic converter (S3 in FIG. 2) implicitly assumes that the temperature in the catalytic converter after the elapse of the non-steady-state transition between the points in time t1 and t2 is equal to the temperature of the exhaust gas at all locations.

Since this is not the case of course, a temperature front passes through the catalytic converter when there are temperature changes on account of increases in the temperature of the exhaust gas, and this gives a false value for the efficiency of the catalytic converter if only the temperature of the exhaust gas is used for its determination.

Figure 3B:
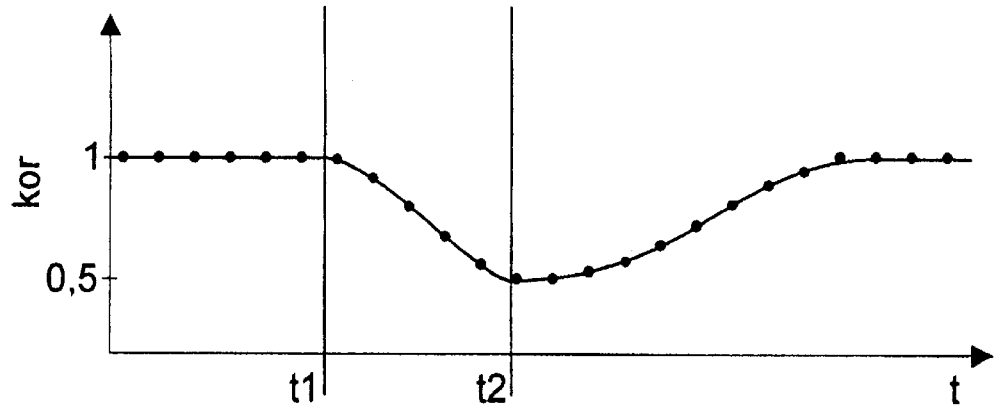

If the efficiency of the catalytic converter is corrected for such errors, caused by a non-isothermy, through the use of the correction factor kor, either the steady-state requirement can be relaxed or fewer iteration steps are discontinued because invalid values (for example >1) for the efficiency of the catalytic converter occur. As FIG. 3b shows, the correction value kor falls to 0.5 during the non-steady-state transitional phase between t1 and t2, and reverts only slowly back to the neutral starting value 1. The multiplication of kor by eta_kat thus adjusts the temperature-dependent error which occurs after non-steady-state operating phases, so that overall the corrected efficiency of the catalytic converter correctly reflects the conditions.

We claim:

1. A method of checking a functional capability of a catalytic converter in an exhaust system of a lambda-controlled internal-combustion engine, the method which comprises:

determining an efficiency value of an efficiency of a catalytic converter by determining an oxygen storage capability of the catalytic converter;

calculating a substitute value for a temperature in the catalytic converter by continuously adding up a heat supplied to the catalytic converter by an exhaust gas for providing a summation value, the heat supplied to the catalytic converter being dependent on a speed and a load of an internal-combustion engine, and subjecting the summation value to a low-pass filtering and calculating the substitute value from the summation value minus a result of the low-pass filtering;

adjusting the efficiency value for temperature influences with the substitute value for providing an adjusted efficiency value; and subsequently obtaining a measure of a functional capability of the catalytic converter from the adjusted efficiency value.

2. The method according to claim 1, which comprises continuously adding up a heat supplied to the catalytic converter by an exhaust gas for calculating the substitute value, the heat supplied to the catalytic converter being dependent on a speed and a load of an internal-combustion engine.

3. The method according to claim 1, which comprises:

calculating a correction factor from the substitute value; and multiplying the efficiency value by the correction factor for providing the adjusted efficiency value.

4. The method according to claim 1, which comprises:

determining a non-steady-state operating condition of an internal-combustion engine when a change of at least one of a speed and a load of the internal-combustion engine exceeds a respective given limit; and suspending at least the step of obtaining the measure of the functional capability of the catalytic converter during the non-steady-state operating condition.

5. The method according to claim 1, which comprises:

performing a plurality of averaging steps for continuously averaging the measure of the functional capability of the catalytic converter; and after a sufficient number of the plurality of averaging steps, deciding that the catalytic converter is functioning, if a last one of the sufficient number of averaging steps results in an averaged value below a threshold value.

* * * * *